United States Patent Office.

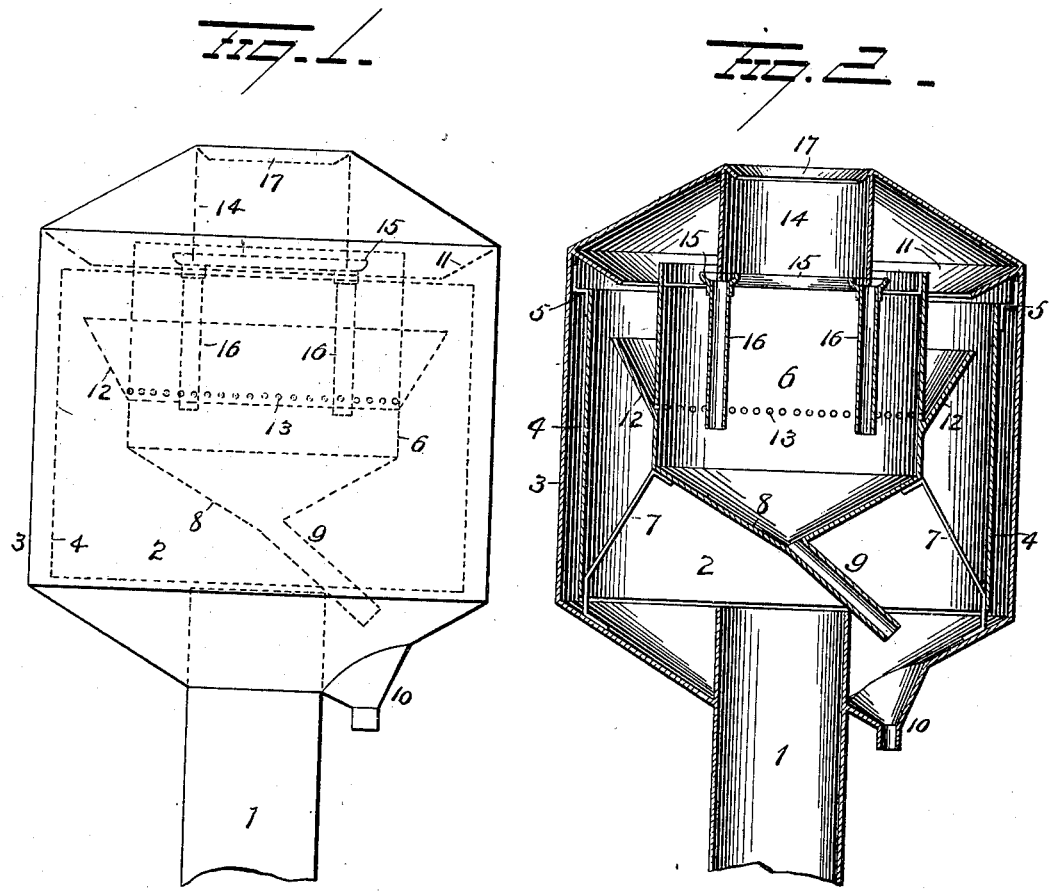

FRANK MARANVILLE AND WILLIAM WARDEN, OF AKRON, OHIO.

EXHAUST-HEAD.

SPECIFICATION forming part of Letters Patent No. 668,448, dated February 19, 1901.

Application filed December 8, 1900. Serial No. 39,168. (No model.)

*To all whom it may concern:*

Be it known that we, FRANK MARANVILLE and WILLIAM WARDEN, of Akron, in the county of Summit and State of Ohio, have invented certain new and useful Improvements in Exhaust-Heads; and we do hereby declare the following to be a full, clear, and exact description of the invention, such as will enable others skilled in the art to which it appertains to make and use the same.

Our invention relates to an improvement in exhaust-heads, the object of the invention being to provide a device of this character with improved means for collecting the water of condensation and conveying it out of the head without bringing it in contact with the steam.

With this object in view the invention consists in certain novel features of construction and combinations and arrangements of parts, as will be more fully hereinafter described, and pointed out in the claims.

In the accompanying drawings, Figure 1 is a view in elevation, and Fig. 2 is a view in section, of the same.

1 represents a steam-exhaust pipe, and 2 our improved exhaust-head secured thereon. The exhaust-head 2 comprises a cylindrical casing 3, contracted at its upper and lower ends, as shown, and provided in the cylindrical intermediate portion with a sleeve or partition-wall 4 of appreciably less diameter than the casing and spaced therefrom and supported by suitable braces 5, secured at their respective ends to the sleeve 4 and casing 3. A cylindrical receptacle 6 of less diameter than sleeve 4 is supported centrally in casing 3 by brackets 7, as shown, and made with an open top and a closed conical bottom 8, disposed above the top of pipe 1 and adapted to serve as a deflector for the steam issuing from said pipe. The bottom 8 is made with a discharge-spout 9, extending to one side of pipe 1 and adapted to convey the water collected in receptacle 6 to the lower end of casing 3 and out of the path of the steam, and a pipe 10 communicates with the lower end of casing 3 for conveying the water to a suitable point for its discharge.

In the interior of casing 3, at the upper end of its cylindrical portion, a separator-ring 11 is provided, which latter is made conical in shape and projects over the upper end of sleeve 4, for a purpose which will more fully hereinafter appear.

A conical trough 12 is provided around the receptacle 6 and communicates with the interior thereof by means of perforations 13 in said receptacle, so as to direct the water collected by the trough into the same.

At the upper open end of the casing 3 is located a sleeve 14, projecting down into receptacle 6 and provided at its lower end, on its inner and outer faces, with a trough 15 to catch water collected upon sleeve 14, and said trough 15 is provided with discharge-spouts 16, projecting down into the receptacle 6 to discharge the water thereinto, and a conical ring 17 is provided in the upper end of sleeve 14 to prevent the water from being carried off by the outgoing steam.

The operation of our improvements is as follows: Steam is supplied by pipe 1 and strikes against the conical bottom 8 of receptacle 6, which latter, together with trough 12, serves as a deflector to direct the steam up behind ring 11 and against which the steam condenses and drops down between sleeve 4 and casing 3 and is carried off by pipe 10. The water condensed against ring 11 and that condensed on the outside of receptacle 6 will fall into trough 12 and pass through perforations 13 into the receptacle and be directed by spout 9 into pipe 10. After the steam strikes ring 11 it will pass around sleeve 14 and be condensed on the inner and outer faces thereof and fall into trough 15 and be directed by spouts 16 into receptacle 6 and discharged from said receptacle by spout 9 into pipe 10, and the ring 17 at the top of sleeve 14 will catch any particles of water which might otherwise be carried off by the escaping steam.

Various slight changes might be resorted to in the general form and arrangement of the several parts described without departing from the spirit and scope of our invention, and hence we would have it understood that we do not wish to limit ourselves to the precise details set forth, but consider ourselves at liberty to make such slight changes and alterations as fairly fall within the spirit and scope of our invention.

Having fully described our invention, what we claim as new, and desire to secure by Letters Patent, is—

1. An exhaust-head comprising an approximately cylindrical casing, an approximately cylindrical receptacle in said casing and of less diameter than the same, a conical bottom on said receptacle to serve as a deflector for the incoming steam, a depending sleeve in the upper open end of the casing, a trough around the lower end of the sleeve, a spout on the trough projecting down into the receptacle, a spout on the receptacle for directing the water of condensation therein into a discharge-pipe communicating with the lower end of the casing.

2. An exhaust-head comprising a casing, a receptacle therein forming a deflector for the steam, a trough around the receptacle communicating with the interior thereof, a spout on the receptacle for discharging its contents into the casing, a pipe communicating with the casing to carry off water collected therein, means for deflecting water of condensation into the trough and means for deflecting water into the receptacle independent of the trough.

3. An exhaust-head comprising a casing having contracted upper and lower ends, a steam-supply pipe projecting into the lower end of the casing, a partition-wall in said casing spaced therefrom, a receptacle in the partition-wall forming a deflector for the steam, a separator-ring in the casing for discharging water of condensation behind the partition-wall, means for discharging water of condensation into the receptacle, a spout on the receptacle for discharging into the casing, a pipe communicating with the casing for carrying off the water and means in the upper contracted end of the casing for preventing the water of condensation being carried off by the escaping steam.

In testimony whereof we have signed this specification in the presence of two subscribing witnesses.

FRANK MARANVILLE.
WILLIAM WARDEN.

Witnesses:
HARRY B. TATO,
CLARA L. SMITH.